United States Patent
Warne

(10) Patent No.: US 11,538,353 B2
(45) Date of Patent: Dec. 27, 2022

(54) MOTION GENERATOR

(71) Applicant: DYNISMA LTD., Bristol (GB)

(72) Inventor: Ashley William Hawker Warne, Bristol (GB)

(73) Assignee: DYNISMA LTD., Bristol (GB)

( * ) Notice: Subject to any disclaimer, the term of this patent is extended or adjusted under 35 U.S.C. 154(b) by 25 days.

(21) Appl. No.: 17/256,400

(22) PCT Filed: Jul. 5, 2019

(86) PCT No.: PCT/EP2019/025216
§ 371 (c)(1),
(2) Date: Dec. 28, 2020

(87) PCT Pub. No.: WO2020/007506
PCT Pub. Date: Jan. 9, 2020

(65) Prior Publication Data
US 2021/0158719 A1 May 27, 2021

(30) Foreign Application Priority Data
Jul. 6, 2018 (GB) ...................................... 1811181

(51) Int. Cl.
*G09B 9/04* (2006.01)
*A63G 31/02* (2006.01)
*G09B 9/12* (2006.01)

(52) U.S. Cl.
CPC ............... *G09B 9/04* (2013.01); *A63G 31/02* (2013.01); *G09B 9/12* (2013.01)

(58) Field of Classification Search
CPC .................................. A63B 31/02; G09B 9/04
See application file for complete search history.

(56) References Cited

U.S. PATENT DOCUMENTS

| 4,666,362 A | 5/1987 | Landsberger et al. |
| 7,172,385 B2 | 2/2007 | Khajepour et al. |
| (Continued) | | |

FOREIGN PATENT DOCUMENTS

| EP | 1063064 A2 | 12/2000 |
| GB | 2378687 A | 2/2003 |
| (Continued) | | |

OTHER PUBLICATIONS

NonFinal Office Action for U.S. Appl. No. 17/256,415, dated Oct. 15, 2021, (9 pages), United States Patent and Trademark Office, USA.

(Continued)

*Primary Examiner* — Kesha Frisby
(74) *Attorney, Agent, or Firm* — Alston & Bird LLP

(57) ABSTRACT

This invention relates inter alia to a motion generator which comprises: an end effector; a stationary support having a base; at least one first tensile member, and at least six second tensile members, wherein each of the at least one first tensile member and the at least six second tensile members comprises a elastic element and each of which tensile members being attached at one end thereof to the end effector and being attached at the other end thereof to the stationary support; in which each tensile member applies a tensile force between the end effector and the stationary support, and in which each one of the at least six tensile members is independently adjustably tensioned by an actuator fixed to the stationary support which acts on the tensile member at a point along its length between the end effector and the elastic element, wherein the actuator acts to change the tension in the part of the tensile member between the end effector and the actuator in order to affect the forces and moments applied to the end effector by the system, wherein the actuator reacts the tensile force it applies to the tensile (Continued)

member against the stationary support, and wherein the tensile force applied by each tensile member to the end effector reacts against the tensile forces applied by the other tensile members via the end effector such that the end effector is maintained in suspension and out of contact with the stationary support by the tensile forces in the tensile members and any other forces applied to the end effector.

25 Claims, 2 Drawing Sheets

(56) References Cited

U.S. PATENT DOCUMENTS

| | | |
|---|---|---|
| 7,753,642 B2 | 7/2010 | Bosscher et al. |
| 9,091,391 B2 | 7/2015 | Thieme-Marti |
| 9,801,775 B2 | 10/2017 | Vallery et al. |
| 10,262,549 B2 | 4/2019 | Warne |
| 10,413,836 B2 | 9/2019 | Blum et al. |
| 2007/0171199 A1 | 7/2007 | Gosselin |
| 2012/0080578 A1 | 4/2012 | Thieme-Marti |
| 2012/0301853 A1 | 11/2012 | Garvis et al. |
| 2016/0140862 A1 | 5/2016 | Van Lookeren Campagne et al. |
| 2016/0236100 A1 | 8/2016 | Douglas et al. |
| 2017/0053548 A1 | 2/2017 | Warne |

FOREIGN PATENT DOCUMENTS

| | | |
|---|---|---|
| GB | 2464814 A | 5/2010 |
| WO | WO-2017/037458 A1 | 3/2017 |
| WO | WO-2018/055387 A1 | 3/2018 |

OTHER PUBLICATIONS

International Searching Authority, International Search Report and Written Opinion for International Application No. PCT/EP2019/025216, dated Sep. 30, 2019, (11 pages), European Patent Office, Rijswijk, Netherlands.

International Searching Authority, International Search Report and Written Opinion for International Application No. PCT/EP2019/025218, dated Oct. 9, 2019, (10 pages), European Patent Office, Rijswijk, Netherlands.

MOTION GENERATOR

CROSS REFERENCE TO RELATED APPLICATIONS

This application is a National Stage Application, filed under 35 U.S.C. § 371, of International Application No. PCT/EP2019/025216, filed Jul. 5, 2019, which international application claims priority to and the benefit of Great Britain Application No. 1811181.5, filed Jul. 6, 2018; the contents of both of which as are hereby incorporated by reference in their entireties.

BACKGROUND

Related Field

The present invention relates to a motion generator, a type of robotic system, for use in a motion system. More particularly, though not exclusively, the invention relates to motion generator having a moveable end effector, such as are currently employed in motion systems such as motion platforms.

Description of Related Art

Motion systems are used in a variety of applications, including motion simulation (for example, flight simulators, driving simulators), robotics, 3D printing, vibration and seismic simulation. The most common type of motion generator used in motion simulation is the Stewart platform. This is a type of parallel robot that has six actuators, attached in pairs to three positions on the baseplate of a platform and crossing over to three mounting points on a top plate. Devices or loads placed on the top plate can be moved in the six degrees of freedom in which it is possible for a freely-suspended body to move, i.e. the three linear movements x, y, z (lateral, longitudinal and vertical), and the three rotations (pitch, roll and yaw). Such motion generators are commonly known as hexapods. Parallel manipulators are preferred to serial manipulators (the most common industrial robots) in motion simulation since they are stiffer and, therefore, more accurate because the motor, which is often the heaviest part of the system, is grounded and not on the end of another actuator. In contrast, serial manipulators tend to have large moving mass and be compliant and, thus, have poor performance.

A motion simulator is a mechanism that can create, for an occupant, the effects or feelings of being in a moving vehicle. Motion simulators are used, professionally, for training drivers and pilots. They also are used, industrially, in the creation, design, and testing of the vehicles themselves. Professional motion simulators used for driving and flying typically synchronize a visual display and/or audio signals with the movement of the carriage occupied by the driver or pilot in order to provide a better sensation of the effect of moving. The advent of virtual reality (VR) head mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience.

Current motion generators and simulators, especially those intended for high-end use such as in military and commercial flight instruction and training applications, are typically very large, heavy, complex and expensive. Their complexity necessitates extensive programming and maintenance, further extending the cost.

EP1063064 discloses a six degree of freedom travelling system including a cage for a human user(s). The cage's position is maintained by eight cables or wires. The system requires a pair of overhead suspension cables and an overhead connection which is disadvantageous in several respects. First, it requires an overhead attachment limiting the location of the system. Second, the overhead suspension cables increase the overall dimensions of the system and make it unsuitable when a compact installation is required.

US2012/0080578 discloses a six degrees of motion platform with a platform supported on a suspension unit which is mounted on a base. The platform, which is particularly designed for planning radiation treatment by simulating movement of a patient to be treated in relation to a radiation therapy device, is moved on the suspension unit by six actuator-controlled non-magnetic/non-metallic strings.

WO2017/037458 discloses a limited movement cable/actuator-controlled motion platform system including a carriage which is capable of movement in the horizontal plane only. The motion platform system relies on a secondary ram-operated motion system for vertical movement which is not backdrivable. The system is quite limited in its application.

U.S. Pat. No. 4,666,362 discloses a three to six degree of freedom cable/actuator-controlled motion platform system including a moving platform (end effector) supported on a base platform by an extensible or telescoping central post. The system is not backdrivable.

US2017/0053548 discloses a motion platform system including a cable/actuator-controlled platform which is slidable on a large low friction fixed base and which allows for significant horizontal movement of the platform. The cables and actuators are disposed around the periphery of the large base, allowing the significant horizontal movement of the platform. A hexapod is in turn mounted on the platform and supports a model cockpit in order to provide further movement. The system is not compact.

Objects of the present invention include inter alia: provide a motion generator which may be capable of the six degrees of motion, or which may be haptic and capable of human input, or which, compared to existing systems, may be mechanically simpler, or cheaper to build, or which may have high backdrivability, or which may be controlled at higher frequencies than anything in a comparable price bracket, and/or which may be manufactured to accompany a virtual reality headset.

BRIEF SUMMARY

The present invention provides a motion generator having a moveable end effector, which motion generator comprises:
an end effector;
a stationary support having a base;
at least one first tensile member; and
at least six second tensile members,
wherein each of the at least one first tensile member and the at least six second tensile members comprises an elastic element and each of which tensile members being attached at one end thereof to the end effector and being attached at the other end thereof to the stationary support; in which each tensile member applies a tensile force between the end effector and the stationary support, and wherein each one of the at least six tensile members is independently adjustably tensioned by an actuator fixed to the stationary support which acts on the tensile member at a point along its length between the end effector and the elastic element, wherein the actuator acts to change the tension in the part of the tensile member between the end effector and the actuator in order to affect the forces and moments applied to the end effector by the system, wherein the actuator reacts the tensile force it applies to the tensile member against the stationary support, and wherein the tensile force applied by each tensile member to the end effector reacts against the tensile forces applied by the other tensile members via the end effector such that the end effector is maintained in suspension and out of contact with the stationary support by the tensile forces in the tensile members and any other forces applied to the end effector.

In the motion generator of the present invention, the end effector is mobile and is supported within an operating volume defined by the stationary support by a plurality of tensile members. The end effector may be a platform. Alternatively, the end effector may be frame or a cradle. According to an embodiment of the invention, the end effector comprises a carriage providing a seat for a human being.

By the term "tensile member", we mean a long and relatively thin, flexible element which transmits tension forces along its length, while easily bending or deforming around a pulley, winch, drum or capstan. A tensile member may have a generally circular cross-section, like a wire or a rope, or may have a generally flattened cross-section, like a belt or ribbon. A tensile member may be chosen to be axially stiff, like a wire rope, but may be chosen to be compliant, like an elastics cord.

The stationary support may be any supporting structure or construction strong enough to support the other components of the system and any payload, such as one or more than one human occupant.

The stationary support may be provided by the walls, floor and ceiling of a room.

Typically, the stationary support may be a rigid, deformation-resistant framework or cage constructed of rods, bars or struts fixed together to form a rigid structure. Rods, bars or struts used in the construction of a framework or cage for use as the stationary support may be formed of moulded or extruded metal or plastics material. The rods, bars or struts will, typically, be bolted, bonded, slotted, riveted or welded together to ensure rigidity.

According to an embodiment, the stationary support comprises a framework or cage structure comprising a lower frame connected by deformation-resistant struts to an upper frame. The lower frame may be a circular frame or a polygonal frame, for example one having a triangular, square, pentagonal or hexagonal shape. The upper frame may be a circular frame or a polygonal frame, for example one having a triangular, square, pentagonal or hexagonal shape. Preferably, if either the lower or the upper frame has a polygonal shape, the sides of the polygon are equal in length.

Preferably, for optimising stability of the generator, the circumference of the lower frame will be greater than the circumference of the upper frame.

According to a preferred embodiment, the stationary support comprises a framework or cage comprising a lower triangular frame fixed by substantially upwardly oriented struts to an upper hexagonal frame.

The inner surfaces of the stationary support define a space or volume within which the end effector is moveable.

The motion generator of the invention comprises at least one first tensile member which comprises an elastic element and which is attached at one of its ends to the end effector and at its other end to the stationary support. The first tensile member applies a tensile force between the end effector and the stationary support. The at least one first tensile member applies a tensile force to the end effector urging the end effector in an upwardly direction, preferably a vertically upwardly direction. The at least one first tensile member may provide sufficient vertical force to hold the system in equilibrium while counteracting the weight of the end effector and any human occupants and the downward tensions in the at least six second tensile members actuated by the actuators. Typically, the system comprises more than one first tensile member. When more than one first tensile member is used, it is preferred that the tensile members are identical in length and material. The location of the attachment of the at least one first tensile member to the end effector is selected to achieve optimum performance. Thus, if only one first tensile member is used the point of attachment of the tensile member to the end effector will preferably be at, or close to, the horizontal centre of gravity of the end effector. If more than first tensile member is used, the locations of attachment of the tensile members to the end effector will preferably be equivalent from the centre of gravity and equally spaced on or around the end effector. According to one preferred embodiment, the system comprises three first tensile members. The use of three first tensile members which attach the end effector to three different locations on the stationary support, which locations are equidistant from each other, and which are attached to the end effector equidistant from each other and equidistant from the centre of gravity of the end effector serves to distribute the forces acting on the end effector by the first tensile members equally around the stationary support.

The function of the elastic element is to keep tension in each tensile member even while the actuators are deactivated and yet still allow some change in length in the tensile member. According to this, at least a portion of the at least one first tensile member comprises a compliant material or device which acts to apply a tension to the tensile member and reacts part or all of the tensile force in the tensile member against the stationary support.

The elastic element may comprise one or more of a helical spring, an elastics cord, an elastics band, a bungee cord, a shock cord, a rubber block, a constant force spring, concentrically-wound metal tape, a compliant structure in bending, a flexure, or any combination thereof.

The elastic element may comprise one or more torsional spring acting on the tensile member via a capstan, pulley, lever or rocker.

The elastic element may be a weight acting on the tensile member via a capstan or pulley.

The elastic element may be adjusted to provide a greater or lesser pre-tension, for example by the wrapping or unwrapping of an elastic medium around a winch or pulley to adjust its free, unextended length.

An elastic element, such as a helical spring, an elastics cord, an elastics band or a bungee cord, need not be connected directly to the stationary support but may, instead, be connected to the stationary support via an axially stiff connecting member, such as a wire rope.

According to an embodiment, the at least one first tensile member comprises a bungee cord.

The at least one first tensile member may be entirely constructed from the elastic element.

According to an embodiment, the at least one first tensile member consists of a bungee cord.

According to a different embodiment, at least one first tensile member consists of two bungee cords in parallel.

According to the present invention, the motion generator comprises at least six second tensile members each one of which being attached, at one of its ends, to the end effector and each one of which being attached, at its other end, to the stationary support.

Each of the at least six second tensile members comprises an elastic element, i.e. at least a portion of each of the at least six second tensile members comprises a material which reacts part or all of the tensile force in the tensile member against the stationary support, acts to keep tension in each tensile member even while the actuators are deactivated and yet still allows some change in length in the tensile member.

The elastic element may comprise one or more of a helical spring, an elastics cord, an elastics band, a bungee cord, a shock cord, a rubber block, a constant force spring, a concentrically-wound metal tape, a compliant structure in bending, a flexure, or any combination thereof.

The elastic element may comprise one or more torsional springs acting on the tensile member via a capstan, pulley, lever or rocker.

The elastic element may include a weight acting on the tensile member via a capstan or pulley.

The elastic element may be adjusted to provide a greater or lesser pre-tension, for example by the wrapping or unwrapping of an elastic medium around a winch or pulley to adjust its free, unextended length.

An elastic element, such as a helical spring, an elastics cord, an elastics band or a bungee cord, need not be connected directly to the stationary support but may, instead, be connected to the stationary support via an axially stiff connecting member, such as a wire rope.

According to an embodiment, each one of the at least six second tensile members comprises an axially stiff tensile material, for example, wire rope. Each one of the at least six second tensile members comprises an elastic element, as mentioned above. The elastic element will form a portion of each of the second tensile members. For instance, each of the at least second tensile members may comprise a portion which is an axially stiff tensile material and a portion which is an elastic element. An example of this is a tensile member which comprises a wire rope, for attachment to the end effector, and an elastic element, such as a low stiffness bungee rope for attachment to the stationary support.

Each of the at least six second tensile members may comprise a portion formed of a material which has good traction, and/or formed to improve traction. This embodiment is useful where the second tensile member passes around or is wrapped around a motorized pulley or motorized capstan. For instance, each of the at least six second tensile members may comprise a toothed belt portion in the region where the tensile member passes around such a motorized pulley or motorized capstan so that the tensile member in this region can engage with teeth or grooves provided on the pulley wheel or capstan spindle.

According to an embodiment, the motion generator of the invention has six second tensile members.

According to an embodiment all of the at least six second tensile members are identical in composition.

According to one preferred embodiment, the motion generator of the invention is one in which the at least six second tensile members are arranged to connect to the end effector to the support in a geometry similar to that in a Stewart Platform. According to this embodiment, the motion generator of the invention comprises six second tensile members, wherein the six second tensile members are identical in composition and have the same length when the system is deactivated and resting in equilibrium, and wherein the six tensile members are arranged in pairs attached at three locations equally spaced apart in the perimeter of the stationary support and are arranged in pairs attached at three locations equally spaced apart to the end effector such that each pair of the second tensile members attached to the end effector comprises one tensile member support and one tensile member taken from another pair of second tensile members attached to the stationary support, the second tensile members of each pair being located adjacent on the stationary support.

In the motion generator of the invention, each one of the at least six tensile members is independently adjustably tensioned by an actuator fixed to the stationary support. The actuator acts on the tensile member at a point along its length between the end effector and the elastic element.

In an embodiment, at least one actuator may comprise a component driven by an electric motor which component is capable of acting on a tensile member to increase or to decrease tension in the tensile member between the end effector and the said motor-driven component. In a preferred embodiment, each one of the at least six second tensile members has its own dedicated actuator comprising a motor-driven component, as described above.

According to an embodiment, at least one actuator may comprise a motorized capstan, a motorized winch or a motorized pulley around which the actuated tensile member passes or wraps. Preferably, each one of the at least six second tensile members has its own dedicated actuator which will comprise a motorized capstan, a motorized winch or motorized pulley. Each actuator may be located in a fixed position relative to the stationary support. Typically, each actuator is fixed to, or near, the base of the stationary support.

An actuator may comprise a free pulley around which the tensile member passes before it is acted upon by a motor-driven component, such as a motorized capstan, motorized winch or motorized pulley. A free pulley may be pivotable about an axis perpendicular to its axis of rotation so that it may pivot as the orientation of the upper span of the tensile member changes as a result of the end effector moving within the system during operation.

The actuator is capable of acting on the tensile member such that the length of the tensile member under tension between the actuator and the end effector may be increased or decreased.

The actuator may comprise a termination block for fixedly attaching the end of a tensile member to the stationary support. As mentioned previously, the end portion of a tensile member which is attached to a termination block may comprise an elastic element to maintain tension in the tensile member.

An actuator acts on a tensile member to change the tension in the part of the tensile member between the end effector and the actuator in order to affect the forces and moments applied to the end effector. Thus, by controlling an actuator to release tension in the tensile member upon which the actuator acts and by controlling a different actuator to increase tension in the tensile member upon which that different actuator acts, the end effector or part thereof can be moved in a direction towards the tensile member in which tension is increased. By individually controlling each actuator, the movement of the end effector may be controlled.

The locations at which the actuators are fixed to the stationary support may be selected such that the actuators are equally spaced around the perimeter of the stationary support, preferably at or near the base of the stationary support.

The locations of the points of attachment of the at least six second tensile members to the end effector may be selected so as to optimise control over the movement of the end effector desired. Preferably, the locations of the attachments of the second tensile members to the end effector will be spatially-selected such that linear movement of the end effector in the lateral, longitudinal and vertical directions and rotations of the end effector about the x-axis, the y-axis and the z-axis are achieved. This may be achieved by selecting locations of attachment of the tensile members to the end effector to be equidistant from the centre of gravity of the end effector. The locations of attachment of the tensile members to the end effector may be equally spaced apart on or around the end effector.

In an embodiment, the majority of the at least one first tensile member attaches to the end effector at a point or points at lower vertical location or locations on the end effector than the points at which the at least six second tensile members attach to the end effector, when the system is deactivated and resting in equilibrium.

The net effect of the tensions in the various tensile members, both the controllable tensions in the actuated tensile members and the non-controllable tensions in unactuated tensile members will be such that the end effector is moveable within the space or volume defined by the inner surfaces of the stationary support and is maintained in suspension, and out of contact with the stationary support.

According to an embodiment, there is provided a motion system comprising a motion generator in accordance with the invention, and a control system. The control system may comprise a microcontroller or a computer which controls the electric motor of each actuator.

Typically, the torques applied to electric motors powering the actuators are coordinated to deliver the required force, torque or motion to the end effector.

In the motion generator of the invention, it is normally intended that a state of equilibrium will exist in which the tensile forces acting on the end effector, the mass of the end effector, the mass of any human occupant or other payload and any other externally applied forces will balance each other out such that no resulting force or moment remains, and that in the vicinity of this point the pre-tensions in the elastic elements naturally tend to drive the end effector to this equilibrium.

According to an embodiment, the at least one first tensile member applies a net resultant force to the end effector whose vertical component is in the upward direction when the system is deactivated and resting in equilibrium and the at least six second tensile members apply a net resultant force to the end effector whose vertical component is in the downward direction when the system is deactivated and resting in equilibrium.

An external force or moment may be applied to the end effector, which results in some movement of the end effector relative to the stationary support.

An external force or moment may be applied to the end effector, and the external force applied is estimated or calculated by measuring the displacement of the actuators and using these measurements with a known mathematical model of the system.

An external force or moment may be applied to the end effector, and the external force applied is estimated or calculated by applying actuator forces or moments to drive the end effector towards a desired position and attitude, and using measurements of the actuator forces or moments applied by the actuators and a known mathematical model of the system.

According to an embodiment, the end effector is used to apply forces or moments to all or part of a human being carried in or on the end effector for the purposes of creating haptic sensations, forces, moments and movements. The end effector may be used to apply forces and moments to the head, hands or torso of any human carried in or on the end effector for the purpose of simulating experiences generated by a computer program, game or simulation. For instance, the end effector may be used to carry a human subject for the purposes of simulating movement and vibrations in the human subject.

In an embodiment, the end effector is adapted to be attached to a human subject, or part thereof, such as to the head or to a hand of the human subject.

The end effector may be used to carry a human subject wearing a virtual reality head mounted display for the purpose of simulating movement and vibrations in the human subject.

The motion generator may be configured such that when a human subject carried on the end effector moves his/her body to generate forces which are reacted against the end effector, these cause the generation of measurable movements or reactions, forces and moments within the system which may be used as an input to a computer program, such as a virtual reality game, or to a simulation. In other words, the motion generator is backdrivable.

For example, the motion generator may be configured such that when a human subject attached to or carried on, the end effector leans or shifts his/her body laterally or longitudinally, which creates reaction forces and moments at the end effector, this causes the generation of measurable movements or reaction forces and moments within the system which may be used to initiate, control or stop a translational movement, such as walking, within a computer program, such as a virtual reality game, or within a simulation.

As will be apparent, the behaviour of the motion generator (which may or may not carry a human subject in or on the end effector) may be controlled by a control unit which, typically, will comprise a processor and a memory. As described above, the control unit may accept, process and act upon input generated by the movement of a human subject carried in or on the end effector.

The system is envisaged to accompany a virtual reality headset worn by a human carried in or on the end effector. This enables immersive motion and visual interactive experiences.

Without compensation from the motor-driven actuators, a human operator can influence the position and attitude of the end effector by moving his/her weight around, and thus creating movements, forces and moments on the end effector. For example, the motion generator can be configured so that the operator leans forward then the system reaches a new equilibrium position which is inclined forwards. This new attitude can be measured from the displacements of the motors and can be used as an input to, for example, a virtual reality computer game experience in which the virtual character walks forward in the game when the operator leans forwards. This backdrivability can be controlled and configured in the motor control software, even to the extent that the system can be made to become stiff and does not incline when the operator moves his/her weight. In this scenario, the operator's movement can still be inferred and used as an input because the motor torques required to keep the end effector stable are known from the controller.

According to a preferred embodiment, the motion generator comprises six actuated tensile members and at least two unactuated tensile members.

According to another aspect of the invention there is provide a motion simulator such as a vehicle motion simulator including a motion generator according to the invention and comprising at least one vehicle control, such as a steering wheel, gear change, or control pedal and an environment simulator such as means for projecting a vehicle environment such as a racetrack, road, off-road scenario or battleground. The environment simulator may include a virtual reality headset or projection system.

According to another aspect of the invention there is provided game apparatus including a motion generator according to the invention. The game apparatus may be located within an amusement arcade for example.

According to a further aspect of the invention, there is provided a combination comprising a motion generator, or a motion system in accordance with the invention, and another motion generator to provide additional movements. The, or each, motion generator in accordance with the invention may be a primary or secondary motion generator in accordance with the invention.

Motion generators in accordance with the invention can be constructed of relatively light weight components. They are stiff, and motion is relatively frictionless compared to Stewart platforms and so is able to be controlled to produce accelerations, motions, forces or moments, of high frequencies, up to and in excess of 50 and more advantageously 100 Hz. Such high frequency (or bandwidth), which permits much more realistic simulation of vehicle behaviour in different scenarios such as racetrack, encountering racetrack features such as sawtooth kerbs, off-road and battlegrounds has not been possible with prior art motion platforms of similar or indeed much greater cost. The motion generator of the invention may be backdrivable which is highly advantageous. Furthermore, the system of the invention may be produced in a commercial format which is much more compact compared to prior art designs, and additionally, does not require overhead suspension devices.

BRIEF DESCRIPTION OF THE FIGURES

These and other aspects of the present invention will now be described, by way of example only, with reference to the accompanying drawings, FIGS. 1 to 4 in which:—

DETAILED DESCRIPTION OF VARIOUS EMBODIMENTS

Motion Generator

Figure 1:
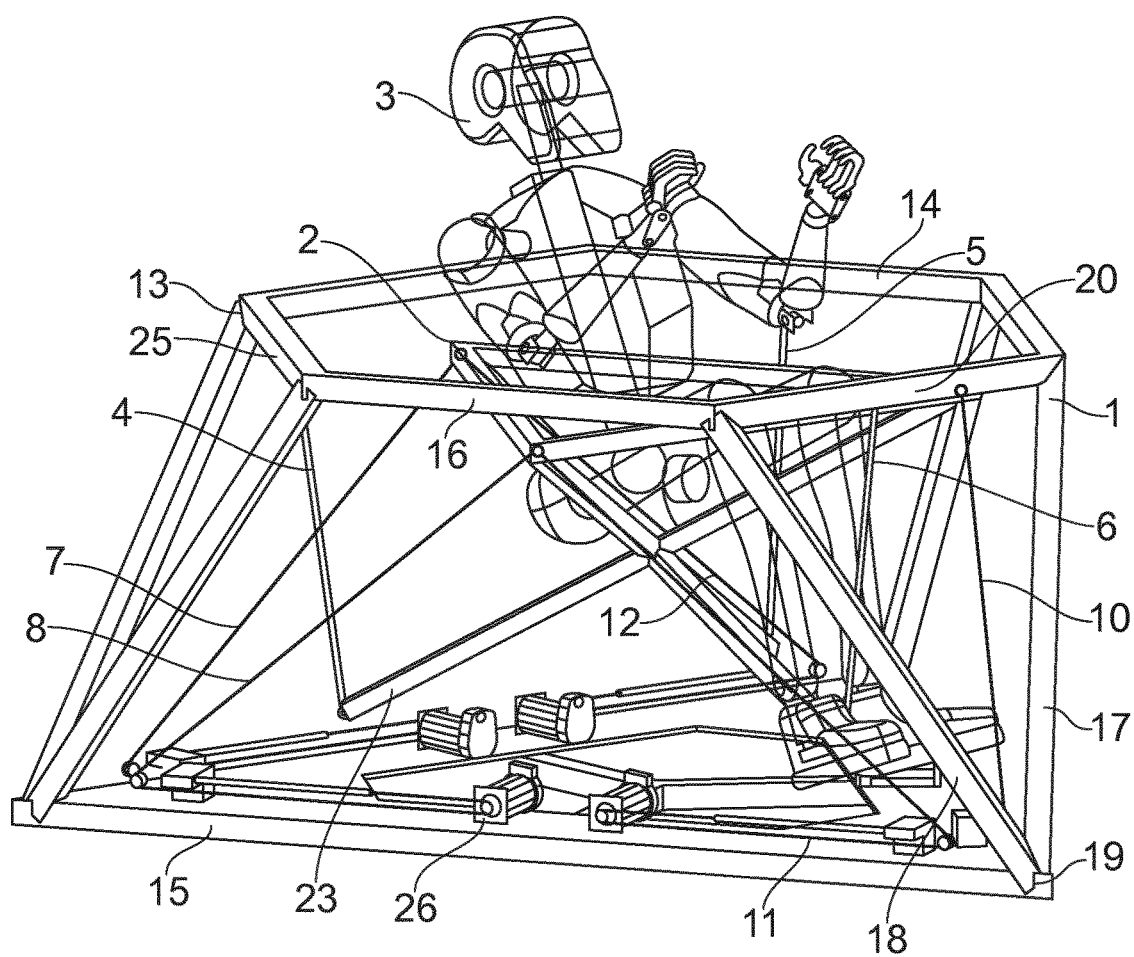
FIG. 1 is a schematic front-right perspective view of a motion generator according to the present invention showing a human operator.
Figure 2:
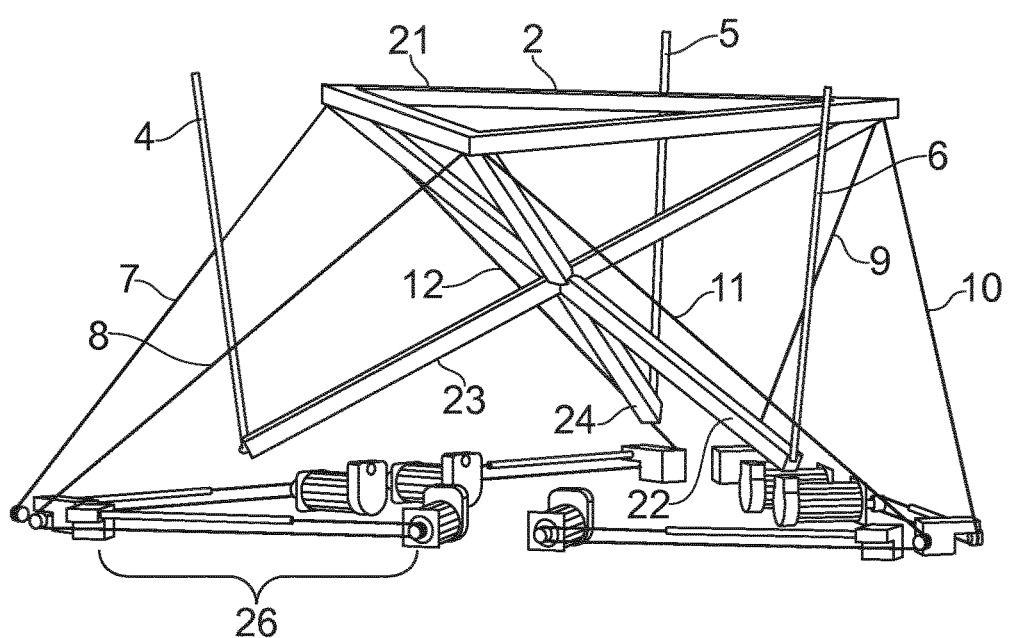
FIG. 2 is a schematic front-right perspective view of the system shown in FIG. 1 but without the human operator and without the stationary support.

Reference is first made to FIG. 1 in which there is shown a motion generator 1 in accordance with an embodiment of the present invention. The system 1 comprises an end effector 2 which is adapted to carry a human subject 3; three first tensile members 4, 5, 6 for supporting the end effector 2 and its load; and six second tensile members 7, 8, 9, 10, 11, 12 for positioning the end effector 2 and its load. The three tensile members 4, 5, 6 respectively connect the end effector 2 to a stationary support 13.

The three tensile members 4, 5, 6, which in the embodiment shown in FIG. 1 are bungee cords (a suitable example of which is a Powerspring by Ibex Marina), are connected to the stationary support 13 at its upper part 14. The six tensile members 7, 8, 9, 10, 11, 12 (a suitable example of which is SS 1×7/1×19 Compacted Wire Rope made by Certex) are connected to the support 13 such that they each maintain the tensile members 4, 5, 6 in tension.

In the embodiment shown in the Figures, the stationary support 13 has an equilateral triangular base 15 and an equilateral hexagonal upper frame 16. Struts 17, 18 are connected at their lower ends to a corner 19 of the triangular base 15 and each is connected at its upper end to either end of one edge 20 of the hexagonal frame 16 such that the struts 17, 18 and edge 20 of the hexagonal frame 16 form an isosceles triangle. End effector 2 is provided, in the form of a cradle, within the three-dimensional space defined by the stationary support 13. As shown in FIG. 1, the cradle is configured to support a human being. The cradle of the end effector 2 comprises an upper triangular frame 21 and three legs 22, 23, 24. Each one of the legs 22, 23, 24 is attached to a different corner of the frame 21 to form a tripod. Each of the tensile members 4, 5, 6 is attached at one of its ends to the end of one of the three legs 22, 23, 24 and at its other end to the midpoint 25 of an edge 20 of the hexagonal frame 16. The tension in the tensile members 4, 5, 6 is such that the tensile members support the cradle above the level of the base of the stationary support 13 so that the cradle is freely moveable without any contact with the level of the base of, or with struts 17, 18 of, the stationary support 13. Each one of the tensile members 7, 8, 9, 10, 11, 12 is attached to a corner of the triangular frame 21 of the cradle such that each corner is attached to two of the tensile members, which two tensile members are attached to two different corners of the triangular base 15 of the stationary support 13.

Figure 3:
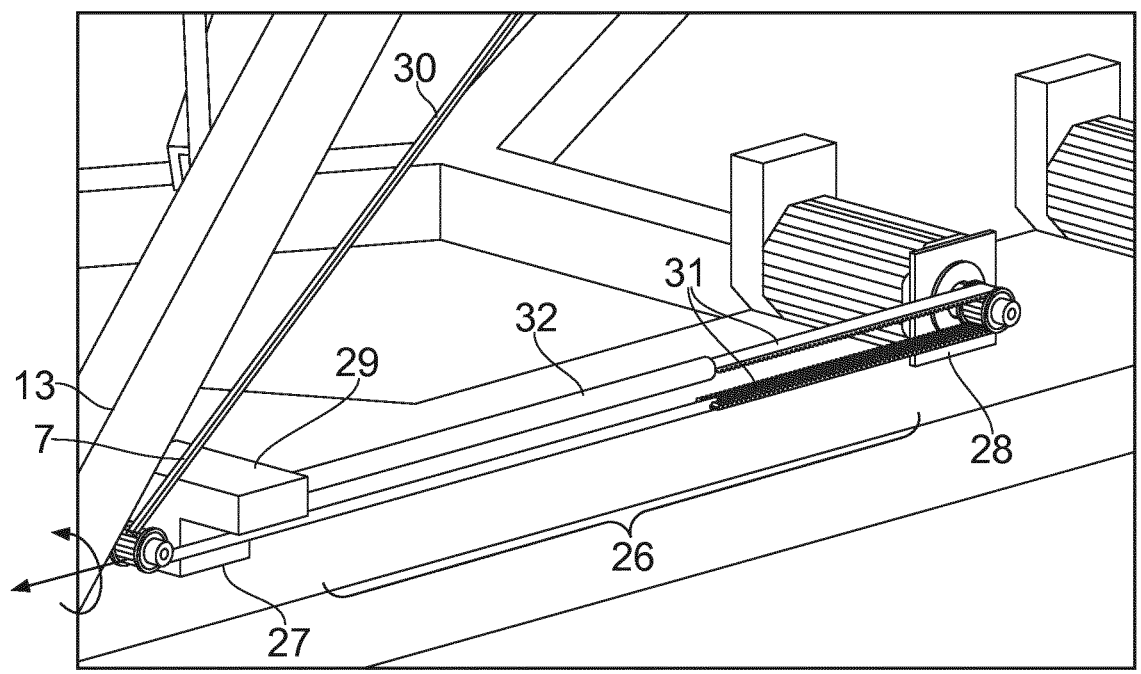
FIG. 3 is a close up of an actuator used in the system shown in FIG. 1.
Figure 4:
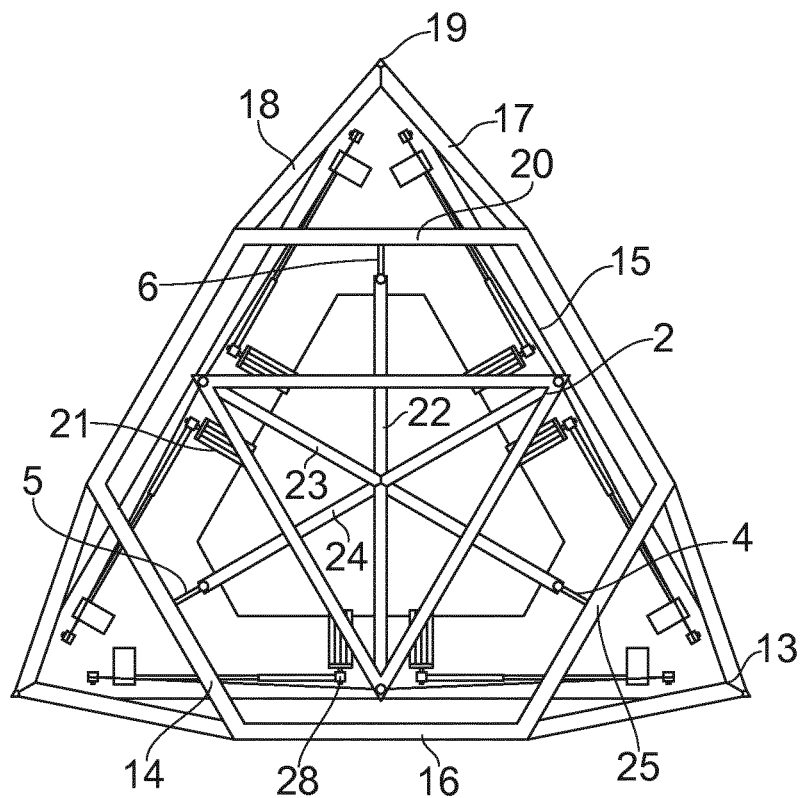
FIG. 4 is a schematic plan view of the system shown in FIG. 1 but without the human operator.

Each of the tensile members 7, 8, 9, 10, 11, 12 is independently adjustably tensioned by an actuator 26 fixed to the stationary support 13. In the embodiment shown in FIG. 3, each actuator 26 comprises a free pulley 27 attached to the base of the support 13, a motorized capstan 28 (a suitable example of a motor is a ClearPath Integrated Servo Motor by Teknic) attached to the base of the support 13 and a termination block 29 attached to the base of the support 13. These components of the actuator 26, however, need not be fixed to the base of the support 13 but could, for instance, be fixed to other parts of the support 13.

The free pulley 27 may be pivotable about an axis perpendicular to the axis of rotation of the pulley. The movement of the end effector 2 may cause a change in orientation of the upper span 30 of a tensile member 7, 8, 9, 10, 11, 12 which passes around the pulley 27. If the free pulley 27 is pivotable about an axis perpendicular to the axis of rotation then it may pivot about that axis as the orientation of the upper span of the tensile member 7, 8, 9, 10, 11, 12 changes such that the axis of rotation of the pulley is maintained in a perpendicular relationship to the upper span of the tensile member.

Each tensile member 7, 8, 9, 10, 11, 12, after passing around a free pulley 27, wraps around a motorized capstan 28. Each capstan 28 is controllably driven to wind or unwind a tensile member 7, 8, 9, 10, 11, 12 so as to decrease or increase, respectively, the length of the tensile member 7, 8, 9, 10, 11, 12. By increasing the length of at least one tensile member and by decreasing the length of at least one different tensile member, the end effector 2 is urged to move within the internal three-dimensional space defined by the stationary support 13. The surface of a tensile member 7, 8, 9, 10, 11, 12 intended to be acted upon directly by the spindle of a capstan 28 may be provided with a suitable finish or conformation to minimize slippage on the spindle i.e. to improve traction. Typically, in order to maximise traction and registration of the tensile member on the spindle, the tensile member may be provided with teeth or ridges moulded or formed into its surface for engagement with the spindle. According to a preferred embodiment, each tensile member 7, 8, 9, 10, 11, 12 comprises a flexible toothed belt portion 31 (a suitable example of which is a GT3 synchronous belt by Gates) in the region of the motorized capstan 28. The end portion 32 of each tensile member 7, 8, 9, 10, 11, 12 is fixed to a termination block 29 fixed to the support 13. Typically, the end portion 32 of the tensile member may comprise a low stiffness bungee rope or cord (a suitable example of which is a Powerspring by Ibex Marina), or more than one bungee rope or cord in parallel. Alternatively, a low stiffness spring, or more than one low stiffness spring in parallel, may be used for the end portion of the tensile member.

In an alternative actuator arrangement (not shown), the free pulley 27 and motorized capstan 28 described above may be replaced by a motorized pulley fixed to the support 13. In order to ensure traction, a tensile member would wrap around such a motorized pulley more than 360o.

Each actuator 26 may be independently operated so as to adjust the length of the tensile member 7, 8, 9, 10, 11, 12 upon which the actuator acts. Operation of the actuators 26, thus, may cause the end effector 2 to move in the space within the support 13. It will be apparent that the system exemplified enables the end effector 2 to be moved in any of the linear directions x, y and z (lateral, longitudinal and vertical), to be subjected to any of the three rotations about the x-axis, the y-axis and the z-axis and any combination of these linear movements and rotations. As such, the system provides the end effector 2 with six degrees of freedom relative to a reference located on the ground beneath the support 13 or on the support itself.

The behaviour of the motion generator in a motion may be controlled by a control unit (not shown). Typically, a control unit will comprise a processor and a memory which comprises a program code that is executed by the processor which operates the drive of the actuator(s). The memory may comprise an environment code to define the environment being simulated. For instance, if the system is applied as a motion simulator, the environment code may define the visual appearance of the simulated activity for display on a screen or in a VR head-mounted unit and may define audio signals relevant to the simulated activity for transmission through one or more loudspeakers or through headphones.

The environment code may also be contained and executed in one or more separated computing units to the control unit, in which case the computing and control units would communicate with each other electronically.

Motion Simulator

In a motion simulator in accordance with the invention such as a vehicle motion simulator or driving simulator, and as shown in general terms in FIG. 1, the end effector 2 is adapted to carry a human subject 3. The human subject is provided with vehicle controls which, typically, are mounted on the end effector 2 and configured for use by the human subject. For example, the end effector 2 may comprise a vehicle chassis or a replica vehicle chassis (not shown in FIG. 1). For a driving simulator, typical vehicle controls may comprise a steering wheel, an accelerator pedal and a brake pedal. For a flight simulator, typical aircraft cockpit controls may comprise a model control panel, joystick to control ailerons and elevators, and foot operated rudder bar/pedal.

Operation of the motion generator is under the control of a control system which controls the actuators to move the end effector replicating movements in a driving situation for the user. Information about the driving environment may be used to govern operation of the control system.

A driving environment is simulated by a visual display system and an audio system. The visual display system includes a projection system which projects images of a driving environment on a screen, and an audio system which generates sounds of a vehicle environment.

The vehicle controls communicate with the control unit such that the human subject (driver/pilot) may provide inputs to the control unit by means of the vehicle controls. The control unit may then provide a visual display and audio signals for the driver/pilot to experience the movement caused by the operation of the vehicle controls.

Game Apparatus

In game apparatus in accordance with the invention, a motion generator in accordance with the invention, typically in the form of a motion system in accordance with the invention (i.e. including a control system controlling the motion generator) is provided with a visual and or audio system, and is operated under user control. For example, in a driving game a human player may experience inputs from a visual and or audio system and operate simulated vehicle controls such as a steering wheel, accelerator, brake, gear shift et cetera.

Method of Producing a Motion Generator

A motion generator in accordance with the invention may be produced using conventional tools and equipment and providing: a stationary support having a base appropriate tensile members, second tensile members, as described above so that each of which tensile members is attached at one end thereof to the end effector and being attached at the other end thereof to the stationary support, and arranging these components so that they function as a motion generator in accordance with the invention.

It will be appreciated by the skilled addressee, that the disclosure of this application relates to a limited number of embodiments only and that many further variants and embodiments may be contemplated without departing from the scope or spirit of the invention.

The invention claimed is:

1. A motion generator comprising:
   a moveable end effector;
   a stationary support having a base;
   at least one first tensile member, and
   at least six second tensile members,
   wherein:
   each of the at least one first tensile member and the at least six second tensile members comprises an elastic element and each of which tensile members is attached at one end thereof to the end effector and attached at the other end thereof to the stationary support;
   each tensile member applies a tensile force between the end effector and the stationary support,
   each one of the at least six tensile members is independently adjustably tensioned by an actuator fixed to the stationary support which acts on the tensile member at a point along its length between the end effector and the elastic element, the actuator acts to change the tension in the part of the tensile member between the end effector and the actuator in order to affect the forces and moments applied to the end effector by the system, the actuator reacts the tensile force it applies to the tensile member against the stationary support, and the tensile force applied by each tensile member to the end effector reacts against the tensile forces applied by the other tensile members via the end effector such that the end effector is maintained in suspension and out of contact with the stationary support by the tensile forces in the tensile members and any other forces applied to the end effector.

2. The motion generator according to claim 1, wherein at least one actuator is attached to the base of the stationary support.

3. The motion generator according to claim 1, wherein the tensile members act on the end effector to provide the end effector with six degrees of freedom.

4. The motion generator according to claim 1, wherein the elastic element is selected from the group consisting of helical springs, elastics cords, elastics bands, bungee cords, shock cords, rubber blocks, constant force springs, concentrically wound metal tapes, a torsional spring acting on the tensile member via a capstan, pulley, lever or rocker, and combinations thereof.

5. The motion generator according to claim 1, wherein the elastic element comprises a weight acting on the tensile member via a capstan or pulley.

6. The motion generator according to claim 1, wherein the elastic element is adjustable to provide a greater or lesser pre-tension.

7. The motion generator according to claim 1, wherein the actuators comprise motorized capstans, winches or pulleys around which the actuated tensile member passes or wraps.

8. The motion generator according to claim 1, wherein the actuators are located in a fixed position relative to the stationary support and rotate about one or more axes.

9. The motion generator according to claim 1, wherein at least one of the at least six second tensile members passes or wraps around a free pulley which is located in a fixed position relative to the stationary support and rotates about one or more axes.

10. The motion generator according to claim 1, wherein there are three first tensile members and six second tensile members, each one of the six second tensile members being independently adjustably tensioned by an actuator.

11. The motion generator according to claim 1, wherein each actuator is powered by an electric motor.

12. The motion generator according to claim 11, wherein the electric motor of each actuator is controlled by a microcontroller or a computer.

13. The motion generator according to claim 12, wherein the torques applied to the electric motors are coordinated to deliver the required force, torque or motion to the end effector.

14. The motion generator according to claim 1, wherein the end effector is adapted to carry a human subject.

15. The motion generator according to claim 1, wherein the end effector is adapted to be attached to a human subject or part thereof.

16. The motion generator according to claim 15, wherein the end effector is configured to be attached to the head or to a hand of the human subject.

17. The motion generator according to claim 1, wherein the at least one first tensile member applies a net resultant force to the end effector whose vertical component is in the upward direction when the system is deactivated and resting in equilibrium, and the at least six second tensile members apply a net resultant force to the end effector whose vertical component is in the downward direction when the system is deactivated and resting in equilibrium.

18. The motion generator according to claim 1, wherein the majority of the at least one first tensile member attaches to the end effector at points which are at lower vertical locations on the end effector than the points at which the at least six second tensile members attach to the end effector, when the system is deactivated and resting in equilibrium.

19. The motion generator according to claim 1, wherein there are six second tensile members and wherein the six second tensile members are identical in composition and have the same length when the system is deactivated and resting in equilibrium, and wherein the six tensile members are arranged in pairs attached at three locations equally spaced apart in the perimeter of the stationary support and are arranged in pairs attached at three locations equally spaced apart to the end effector such that each pair of the second tensile members attached to the end effector comprises one tensile member taken from one pair of second tensile members attached to the stationary support and one tensile member taken from another pair of second tensile members attached to the stationary support, the second tensile members of each pair being located adjacent on the stationary support.

20. A motion system comprising:
a control system; and
a motion generator comprising:
 a moveable end effector;
 a stationary support having a base;
 at least one first tensile member, and
 at least six second tensile members,
 wherein:
  each of the at least one first tensile member and the at least six second tensile members comprises an elastic element and each of which tensile members is attached at one end thereof to the end effector and attached at the other end thereof to the stationary support;
  each tensile member applies a tensile force between the end effector and the stationary support,
  each one of the at least six tensile members is independently adjustably tensioned by an actuator fixed to the stationary support which acts on the tensile member at a point along its length between the end effector and the elastic element,
  the actuator, via the control system, acts to change the tension in the part of the tensile member between the end effector and the actuator in order to affect the forces and moments applied to the end effector by the system,
  the actuator, via the control system, reacts the tensile force it applies to the tensile member against the stationary support, and
  the tensile force applied by each tensile member to the end effector reacts against the tensile forces applied by the other tensile members via the end effector such that the end effector is maintained in suspension and out of contact with the stationary support by the tensile forces in the tensile members and any other forces applied to the end effector.

21. The motion system of claim 20, wherein the motion generator is a first motion generator and the system further comprises a second motion generator.

22. An apparatus comprising:
at least one vehicle control;
an environmental simulator executed by a control system; and
a motion generator comprising
- a moveable end effector having the at least one vehicle control mounted thereto;
- a stationary support having a base;
- at least one first tensile member, and
- at least six second tensile members, wherein:
- each of the at least one first tensile member and the at least six second tensile members comprises an elastic element and each of which tensile members is attached at one end thereof to the end effector and attached at the other end thereof to the stationary support;
- each tensile member applies a tensile force between the end effector and the stationary support,
- each one of the at least six tensile members is independently adjustably tensioned by an actuator fixed to the stationary support which acts on the tensile member at a point along its length between the end effector and the elastic element,
- the actuator, via the control system, acts to change the tension in the part of the tensile member between the end effector and the actuator in order to affect the forces and moments applied to the end effector by the system,
- the actuator, via the control system, reacts the tensile force it applies to the tensile member against the stationary support, and
- the tensile force applied by each tensile member to the end effector reacts against the tensile forces applied by the other tensile members via the end effector such that the end effector is maintained in suspension and out of contact with the stationary support by the tensile forces in the tensile members and any other forces applied to the end effector.

23. The apparatus according to claim 22, wherein the environment simulator is at least one of a visual display system or an audio system.

24. The apparatus according to claim 22, wherein the apparatus is a vehicle simulator.

25. The apparatus according to claim 22, wherein the apparatus is a game apparatus located within an amusement arcade.

* * * * *